United States Patent
Schwengler et al.

(12)

(10) Patent No.: US 9,100,190 B1
(45) Date of Patent: *Aug. 4, 2015

(54) PREVIEWING A DIGITAL CERTIFICATE IN A GRAPHICAL USER INTERFACE

(75) Inventors: Stefan Schwengler, Miami, FL (US); Len Toyoshiba, San Jose, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 451 days.

This patent is subject to a terminal disclaimer.

(21) Appl. No.: 13/368,299

(22) Filed: Feb. 7, 2012

Related U.S. Application Data (60) Provisional application No. 61/440,310, filed on Feb. 7, 2011.

(51) Int. Cl.
 H04L 29/06 (2006.01)
 H04L 9/32 (2006.01)
(52) U.S. Cl.
 CPC .............. H04L 9/3263 (2013.01); H04L 63/00 (2013.01)
(58) Field of Classification Search
 CPC . H04L 63/0823; H04L 9/3263; H04L 9/3268; G06F 21/33
 USPC .......................................................... 713/156
 See application file for complete search history.

(56) References Cited

U.S. PATENT DOCUMENTS

| | | | | |
|---|---|---|---|---|
| 2009/0164886 | A1* | 6/2009 | Shah et al. ...................... | 715/243 |
| 2011/0047374 | A1* | 2/2011 | Liu et al. ....................... | 713/156 |
| 2011/0213961 | A1* | 9/2011 | Wnuk et al. ................... | 713/156 |

OTHER PUBLICATIONS

Landmann, Red Hat Certificate System 8.0; Admin Guide, Installing, configuring, and managing Red Hat Certificate System 8.0 Subsystems Edition 8.0.22. Landmann. rlandmann@redhat.com, pp. 1-564.*

* cited by examiner

*Primary Examiner* — Harunur Rashid
(74) *Attorney, Agent, or Firm* — Patterson & Sheridan LLP (57) ABSTRACT

A graphical user interface can be provided for creating a digital certificate profile for a digital certificate. In one embodiment, the graphical user interface presents a plurality of certificate profile attributes that are selectable by a user. In one embodiment, a certificate profile preview representing an example certificate to be generated from the digital certificate profile using a subset of the selected certificate profile attributes is generated and a graphical representation of the generated certificate profile preview is provided in the graphical user interface.

15 Claims, 8 Drawing Sheets

PREVIEWING A DIGITAL CERTIFICATE IN A GRAPHICAL USER INTERFACE

CROSS-REFERENCE TO RELATED APPLICATIONS

This Application claims the priority benefit U.S. Provisional Patent Application 61/440,310 filed on Feb. 7, 2011, entitled "VERISIGN USER INTERFACE," which is hereby incorporated by reference in its entirety.

TECHNICAL FIELD

Embodiments of the present invention relate to digital certificates. Specifically, the embodiments of the present invention relate configuring digital certificate profiles.

BACKGROUND

Digital certificates are widely used in computing technology for person authentication, encryption, secure email, and device authentication. Digital certificates (also sometimes referred to as Public Key Certificates) bind a public key or a public/private key pair to an identity, such as a user name, email address, or IP address. Numerous secure protocols, such as HTTPS and SSH use digital certificates distributed and authenticated using a public key infrastructure (PKI). One popular PKI and digital certificate format is the X.509 digital certificate.

An entity providing a PKI service to an enterprise can provide an interface to allow a system administrator to generate digital certificate profiles that can be used to create digital certificates, which can then be distributed to users or devices. However, configuring a digital certificate profile to have certain characteristics is a difficult and time consuming task requiring significant expertise.

SUMMARY

In one embodiment, a computer-implemented method is provided that includes providing a graphical user interface for creating a digital certificate profile for a digital certificate, the graphical user interface presenting a plurality of certificate profile attributes selectable by a user, generating a certificate profile preview representing an example certificate to be generated from the digital certificate profile using a subset of the selected certificate profile attributes, and providing a graphical representation of the generated certificate profile preview in the graphical user interface. In one embodiment, the graphical representation of the certificate profile preview comprises a certificate table comprising a first column having a list of certificate fields and a second column having a list of values corresponding to the certificate fields. In one embodiment, the list of values includes structural representations of values to be collected when creating digital certificates using the digital certificate profile. In one embodiment, the list of values includes values as they will appear on digital certificates created using the digital certificate profile.

In one embodiment, one of the received certificate profile attributes comprises an identification of a certificate authority to be used for creating digital certificates using the digital certificate profile. In one embodiment, generating the certificate profile preview comprises generating a certificate authority hierarchy associated with the identified certificate authority. In one embodiment, the method further includes providing a graphical tree representation of the generated certificate authority hierarchy associated with the identified certificate authority. In one embodiment, the certificate profile preview is automatically updated when the user selects a new set of certificate profile attributes in the graphical user interface.

In another embodiment, a system is provided having a memory and a processor coupled to the memory to provide a graphical user interface for creating a digital certificate profile for a digital certificate, the graphical user interface presenting a plurality of certificate profile attributes selectable by a user, generate a certificate profile preview representing an example certificate to be generated from the digital certificate profile using a subset of the selected certificate profile attributes, and provide a graphical representation of the generated certificate profile preview in the graphical user interface.

In yet another embodiment, a non-transitory computer readable storage medium is provided that includes instructions that, when executed by a processor, cause the processor to perform a method of providing a graphical user interface for creating a digital certificate profile for a digital certificate, the graphical user interface presenting a plurality of certificate profile attributes selectable by a user, generating a certificate profile preview representing an example certificate to be generated from the digital certificate profile using a subset of the selected certificate profile attributes, and providing a graphical representation of the generated certificate profile preview in the graphical user interface.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for configuring a digital certificate profile.

Figure 1:
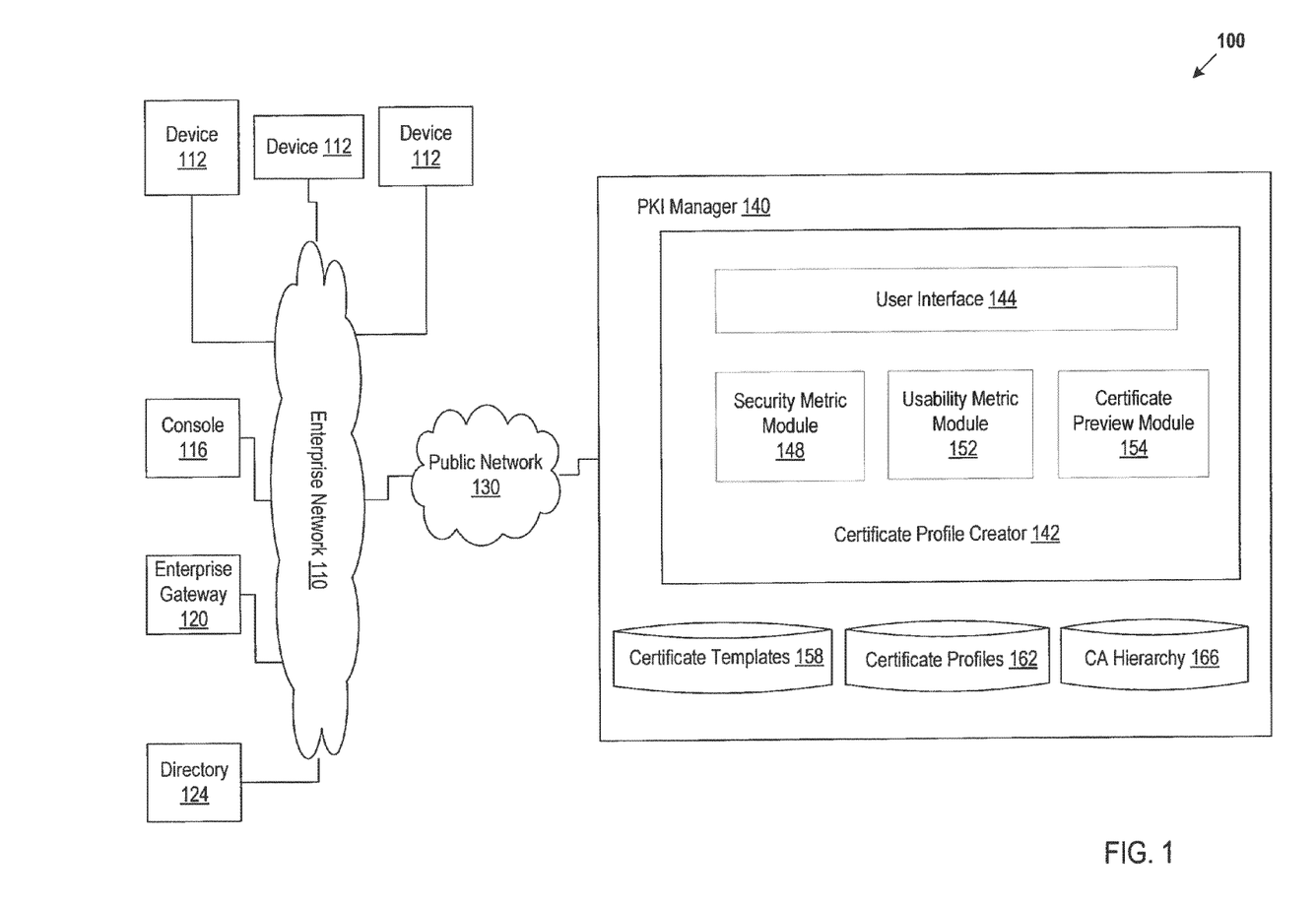
FIG. 1 is a block diagram of one embodiment of a cloud-based PKI manager operating in an exemplary network architecture.

FIG. 1 is an exemplary operating environment 100 in which embodiments of the present invention can be implemented. The operating environment 100 may include various devices 112 connected to an enterprise network 110. The devices 112 can include computers, tablets, other mobile devices, servers, clients, printers, workstations, and generally any network device. The enterprise network 110 may be a local area network (LAN), a wide area network (WAN) a combination of LANs and WANs or some other enterprise network topology. The embodiments of the present invention are not limited to the specific environment 100 shown in FIG. 1.

In one embodiment, a console 116 is also connected to the enterprise network 110. The console 116 can be implemented on any type of machine device, such as devices 112. In one embodiment, the console 116 is a browser or application-based interface to a PKI manager system 140. In one embodiment, the PKI management system 140 is implemented as a cloud based service connected to the enterprise network 110 via a public network 130, such as the Internet. However, in other embodiments, the PKI manager 140 can be implemented as one or more servers connected to the enterprise network 110.

In one embodiment, there is one or more directory servers 124 connected to the enterprise network 110 to provide centralized and managed directory services to the enterprise. The directory 124 can be an implementation of Active Directory™ from Microsoft®, some implementation of the Lightweight Directory Access Protocol (LDAP), or another form of centralized or distributed network directory. In one embodiment, these is also one or more enterprise gateways 120 connected to the enterprise network 120, such as the Symantec PKI Gateway™, to provide an interface between the directory 124 and the PKI manager 140.

As set forth above, in one embodiment, a system administrator uses the console interface 116 to access the PKI manager 140 over a public network. The PKI manager 140 can be provided by a PKI provider entity as software-as-a-service (SaaS), or it can be managed internally by the enterprise. As shown in FIG. 1, the PKI manager 140 is provided in a SaaS model, with the software being accessed via the console interface 116.

The user of the console 116—typically a systems administrator of the enterprise—can use the PKI manager 140 to manage the digital certificates used for the enterprise. One task of the user of the PKI manager 140 is the creation of digital certificate profiles that can be used to generate key pairs and digital certificates on the machines of requesting clients. A digital certificate profile defines the characteristics and attributes of digital certificates created using that profile.

For example, a digital certificate profile to be used for generating authentication certificates for Smartcards will generally have some attributes that are different from a digital certificate profile to be used for generating encryption certificates for electronic mail. Other general digital certificate types that have some differing attributes include digital signature certificates, disk encryption certificates, and device certificates used for uniquely identifying hardware devices such as disk drives, cable boxes, and computers.

Figure 7:
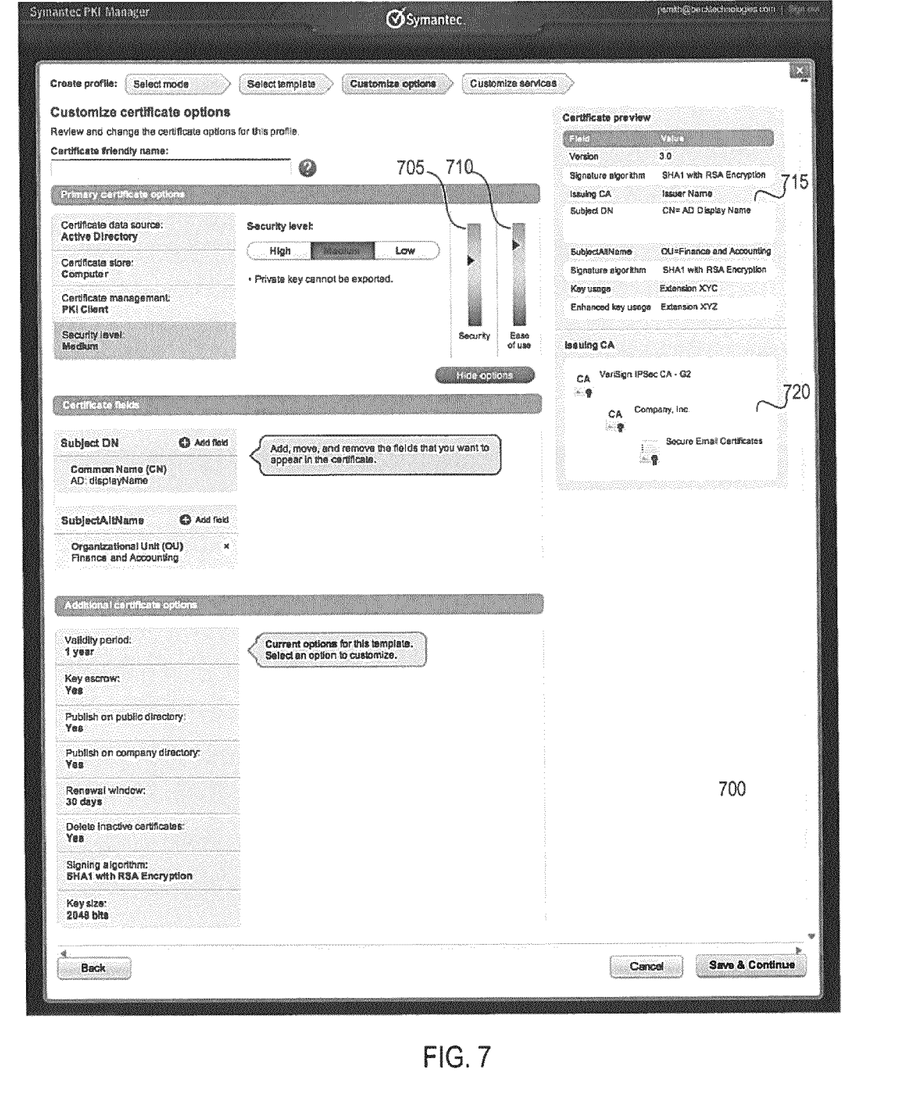
FIG. 7 is a screenshot of one embodiment of the console interface for the PKI manager.

In one embodiment, to help the user create digital certificate profiles, the PKI manager 140 includes a certificate profile creator module 142. In one embodiment, the certificate profile creator 142 includes a user interface 144 to generate the display elements displayed by the console 116. In one embodiment, the user interface 144 is a graphical user interface (GUI). A screenshot of an example of such a GUI as viewed in a console, browser, application, or other client entity is shown in FIG. 7.

In one embodiment, the user interface 144 (as displayed in console 116) provides the user a selection of certificate templates 158 from which to begin the creation of a new digital certificate profile. Alternately, the user can edit an existing certificate profile 162 using the certificate profile creator 142. The user can also begin from a blank template and create a custom certificate profile rather than customizing a template.

In one embodiment, the certificate profile creator module 142 also includes a security metric module 148. The security metric module 148 can generate a security metric based on the various attributes of the certificate profile being created and edited. In one embodiment, the security metric is an indication of the vulnerability of digital certificates created based on the certificate profile to compromise. For example, a digital certificate that can be exported from one device to another is more vulnerable to compromise than one that is only valid on one device. Similarly, a digital certificate that is that can only be used in conjunction with a password is less vulnerable than one that can be used without a password.

In one embodiment, the certificate profile creator module 142 also includes a usability metric module 152. The usability metric module 152 can generate a usability metric based on the various attributes of the certificate profile being created and edited. In one embodiment, the usability metric is an indication of the ease of use of digital certificates created based on the certificate profile for end users of the digital certificate. For example, a digital certificate that is installed directly on a computer is easier to use (more convenient) than one that is installed on a Smartcard, as the user is required perform a more complicated install and then to carry the Smartcard. Similarly, a digital certificate that requires a password when used is less convenient, and thus harder to use, than one does not. Not all examples of security and ease of use have inverse relationships. Some certificate profile attributes create certificates that are both more secure and easier to user and vice versa, as will be discussed further below.

In one embodiment, the certificate profile creator module 142 also includes a certificate preview module 154. The security preview module 154 can generate a graphical or visual preview of the certificate profile being created and edited. In one embodiment, the certificate preview allows a user to see what a digital certificate based on the certificate profile would look like before actually generating such a certificate. In one embodiment, the certificate preview module 154 also displays the certificate authority (CA) chain associated with any CAs selected to be used to sign certificates generated using the certificate profile.

Figure 2:
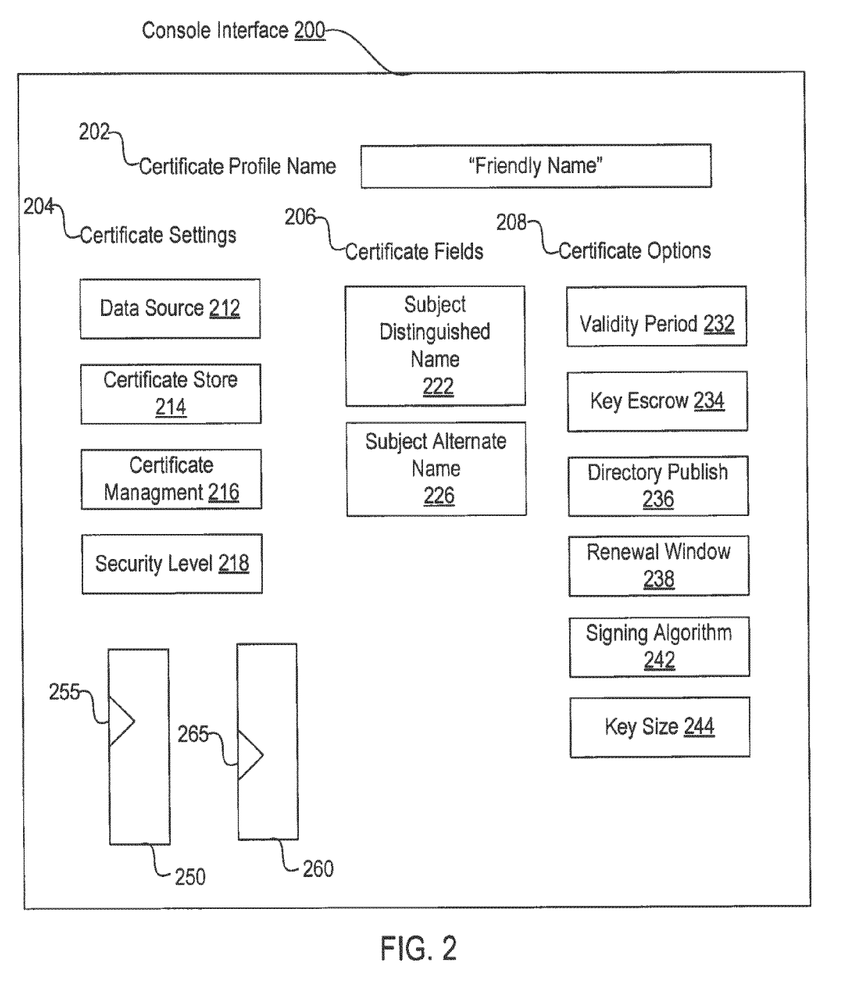
FIG. 2 is a block diagram of one embodiment of a console interface for a PKI manager.

One embodiment, of the console interface 200 (which can be one implementation of the console 116 of FIG. 1) is now described with reference to FIG. 2. As mentioned above, in one embodiment, the console interface 200 displays structures and data generated by the user interface 144 or the certificate profile creator 142 and allows user interaction and user input collection. In one embodiment, the interface 200 provides a field where the user can enter a certificate profile name 202, such as "Smartcard for Finance Employees Certificate."

The interface 200 also displays a set of certificate profile attributes to the user and allows the user to configure most or all of the displayed attributes. In one embodiment, the certificate profile attributes include certificate settings 204, certificate fields 206, and certificate options 208. In other embodiments, the certificate profile attributes can be categorized another way or they may not be categorized at all.

In one embodiment, the certificate settings 204 include a selection of data source 212 for the certificate profile that defines where to import data from when creating certificates. In one embodiment, data source 212 options include Active Directory™ (indicating to import fields such as "name" and "email address," into certificates from the Active Directory server 124) and PKI manager upload (indicating that the information will be manually uploaded into the PKI manager 140.)

In one embodiment, the certificate settings 204 include a selection of certificate store 214 for the certificate profile that defines where to the certificates created using the certificate profile can be stored. In one embodiment, certificate store 214 options include Computer (indicating that the certificates will be stored on a computer-type device, such as a server, desktop, laptop, or mobile device) and Smart Card (indicating that the certificates will be stored on a smart card or similar integrated circuit card-type apparatus.)

In one embodiment, the certificate settings 204 also include a selection of certificate management tool 216 for the certificate profile that defines where how the generated certificates will be managed. In one embodiment, certificate management 216 options include a PKI client (indicating that a client software program will be installed along with the certificates at the end user device to manage the certificate) and OS (indicating the certificate will be managed through the regular operating system API provided by the device on which it is installed.)

In one embodiment, the certificate settings 204 also include a selection of certificate security 218 for the certificate profile that defines two or more levels of security settings. In one embodiment, certificate security 218 options include high, medium, and low, although other options can be provided. In one embodiment, the security setting options correspond to various security related settings such as the requirement of a password when using the certificate, the password strength requirements if a password is used, whether the certificate can be exported, and other such settings. In other embodiments, these setting can be set independently of one another.

In one embodiment, the certificate fields 206 allow the user to configure the structure of the Subject Distinguished Name (Subject DN) 222 and the Subject Alternative Name (SAN) 226 using fields and values defined by the certificate specification, such as the X.509 specification. In one embodiment, the console interface 200 also allows the configuration of various other certificate options 208, such as the validity period 232 of the certificates, any key escrow 234 for the certificates, a directory publish selector 236 to choose whether the certificates are published in a publicly accessible and/or private directory, the renewal window 238 of the certificates, the signing algorithm 242 of the certificates (such as SHA1 with RSA Encryption) to be used by the CA, and a key size 244 indicating the size of the public key bound to the identity of the owner of the certificate. Other configuration options are possible, such as whether inactive certificates should be automatically deleted, among others.

All of the configuration options listed above, as well as any additional options not listed, together make up the certificate profile attributes for the particular digital certificate profile being created or edited. In one embodiment, to aid the user of the console interface 200 in creating or editing the digital certificate profile, the console interface 200 displays a security graphic 250 that indicates a relative level of vulnerability to compromise or misuse of certificates created using the digital certificate profile. In one embodiment shown in FIG. 2, the security graphic 250 is a slider bar with a slider 255 indicating a relative value of the security associated with the certificate profile.

In one embodiment, the slider bar is color graded to indicate different levels of security from green (secure) to red (not secure), although other colors can be used. The slider bar can also have a numeric scale, labeled high and low sides, or be unlabeled with the implicit understanding that the slider moving in a certain direction (e.g., up or right) indicates a relatively more secure certificate. In other embodiments, other kind of graphical representations can be used, such as charts, graphs, or generally any visual indication of a relative value.

In one embodiment, to aid the user of the console interface 200 in creating or editing the digital certificate profile, the console interface 200 displays a usability graphic 260 that indicates a relative level of ease of use of certificates created using the digital certificate profile. In one embodiment shown in FIG. 2, the usability graphic 260 is a slider bar with a slider 265 indicating a relative ease of use associated with the certificate profile. The usability graphic can be implemented in any of the ways that the security graphic is.

In one embodiment, the security graphic 250 and the usability graphic 260 are identical in appearance and appear in near proximity to allow the user to monitor changes to the sliders 255, 265 in relation to each other. In one embodiment, as a certificate attribute is changed, any effect such change has on the security graphic 250 and/or the usability graphic 260 is reflected in real time.

Figure 3:
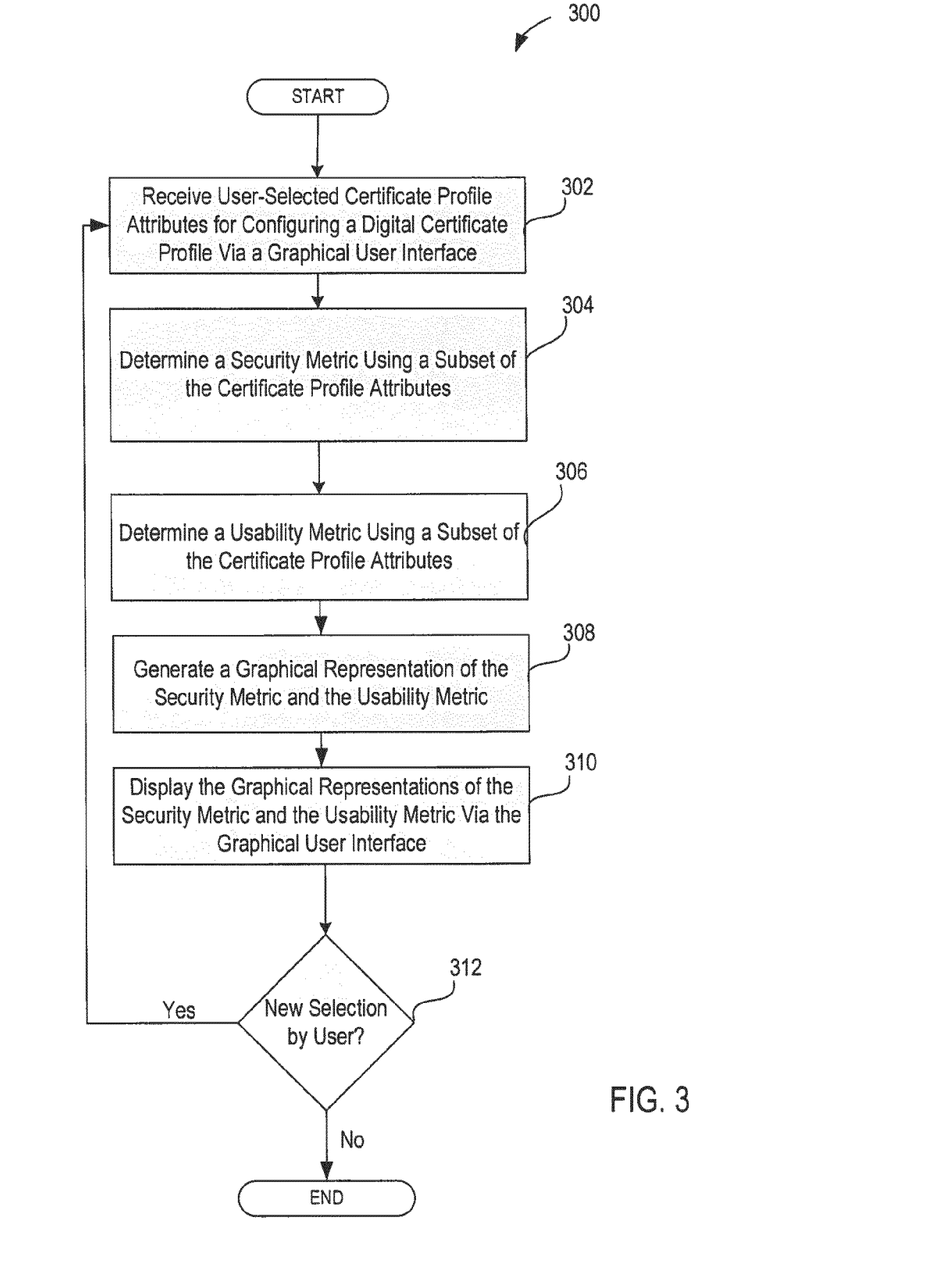
FIG. 3 is a flow diagram of one embodiment of a method for certificate profile configuration.

One embodiment of providing the security and usability graphics is now described with reference to FIG. 3. The processing can be performed by processing logic that may comprise hardware (circuitry, dedicated logic, etc.), software (such as is run on a general purpose computer system or a dedicated machine), or a combination of both. The method shown in FIG. 3 may be performed by the security metric module 148 and the usability metric module 152 in conjuction with the user interface 144 of FIG. 1, though it may also be performed by other processing logic.

The processing begins at block 302 with the reception of user-selected certificate profile attributes. The user may be using the console interface to configure a certificate profile, and the current state of the selected certificate profile attributes is sent to the PKI manager as it is entered by a user interacting with the console interface. At block 304, a security metric is determined using a subset of the certificate profile attributes selected by the user. In one embodiment, the subset of certficate profile attributes used can include all of the certificate profile attributes. However, in most real-world embodiments, not every certificate profile attribute will influence the security metric.

In one embodiment, the certificate profile attributes included in this subset include the data source, the certificate store, the certificate management tool, and the security level, all described above. The subset of certificate attributes used to calculate the security metric can also include various other attributes and options, such as password length, validity period, and other attributes. In one embodiment, the security metric is a numeric value on a scale, such as 0-10, where 0 indicates a lack of security and 10 indicates the most security. The scale can be determined by starting with every possible certificate attribute in the subset being set to the least secure selection and then the most secure selection and performing the security metric calculation on both settings.

The security metric calculation can be any formulaic operation performed on the attributes in the selected subset. For example, every attribute having a more secure setting can add one to the metric and every attribute having a less secure metric can add zero to the metric or subtract one from the metric. In one embodiment, the security metric is on a scale of 0-6 and is determined by the formula: start with (+2); if data source=Active Directory (+1); if certificate store Smartcard (+1); if certificate management=PKI client (+1); if certificate management=OS (−1); if security=high AND certificate store=Smartcard (+1); if security=high AND certificate store=computer AND certificate management=PKI client (+1); if security=low AND certificate store=computer AND certificate management=PKI client (−1); if security=low AND certificate store=computer AND certificate management=OS (−1). Various other scaled, formulas, and input attributes can be used in place of the example formula provided. In one embodiment, the calculation of the security metric is performed by the security metric module 148 in FIG. 1.

At block 306, a usability metric is determined using a another subset of the certificate profile attributes selected by the user. In one embodiment, the subset of certficate profile attributes used can include all of the certificate profile attributes. However, in most real-world embodiments, not every certificate profile attribute will influence the usability metric. The subset of certificate attributes used in block 304 to determine the security metric may be the same subset of certificate attributes used in block 306 to determine the usability metric, or they may be different subsets.

In one embodiment, the certificate profile attributes included in this subset also include the data source, the certificate store, the certificate management tool, and the security level, all described above. The subset of certificate attributes used to calculate the usability metric can also include various other certificate profile attributes. In one embodiment, the usability metric is a numeric value on a scale, such as 0-10, where 0 indicates the least ease of use and 10 indicates the most ease of use. The usability metric calculation can be any formulaic operation performed on the attributes in the selected subset. For example, every attribute having a more user-friendly setting can add one to the metric and every attribute having a less user-friendly metric can add zero to the metric or subtract one from the metric. In one embodiment, the usability metric is on a scale of 0-6 and is determined by the formula: start with (+2); if data source=Active Directory (+1); if data source=PKI Manager (−1); if certificate store=Smartcard (−1); if certificate store=computer (+1); if certificate management=PKI client (+1); if certificate management=OS (−1); if security=high AND certificate store=Smartcard (−1); if security=high AND certificate store=computer AND certificate management=PKI client (−1); if security low AND certificate store=computer AND certificate management=PKI client (+1); if security=low AND certificate store computer AND certificate management=OS (+1). Various other scaled, formulas, and input attributes can be used in place of the example formula provided. In one embodiment, the calculation of the usability metric is performed by the usability metric module 152 in FIG. 1.

At block 308, a graphical repsensetation of the security metric and a graphical representation of the usablity metric is generated. The graphical representations can be sliders bars such as shown in FIG. 2 and FIG. 7, although, as explained above, many other types of graphical represnetations are possible. In one embodiment, the calculation of the usability metric is performed by the user interface 144 in FIG. 1.

At block 310, the graphical represnetations generated are displayed to the user via the console interface or some other type of GUI as a security graphic and a usability graphic. In one embodiment, the graphics are displayed side by side. The two graphics can be displayed in the same display that is used to configure and edit the digital certificate profile, as shown, for example, in FIG. 2 and FIG. 7.

At block 312, a determination is made as to whether a new certificate attribute selection was made by the user via the console interface. If a new certificate attribute selection is detected in either the subset of certificate attributes used to determine the security metric or the subset of certificate attributres used to determine the usability metric, the processing begins anew at block 302 with the receipt of the updated certificate attribute selection or selections. In this manner, changes made by the user can result in near-instantaneous updates to the security graphic and the usability graphic.

In the embodiment described above, the users selection of certificate attributes was used to display graphics indicating the security and usability of the certificates to be based on the certificate profile being created. In one embodiment, the user can also make certificate attribute selections indirectly by directly interacting with the security graphic and/or the usability graphic. Processing to implement one such embodiment is now described with reference to FIG. 4. The processing can be performed by processing logic that may comprise hardware (circuitry, dedicated logic, etc.), software (such as is run on a general purpose computer system or a dedicated machine), or a combination of both. The method shown in FIG. 4 may be performed by the security metric module 148 and the usability metric module 152 in conjuction with the user interface 144 of FIG. 1, though it may also be performed by other processing logic.

Figure 4:
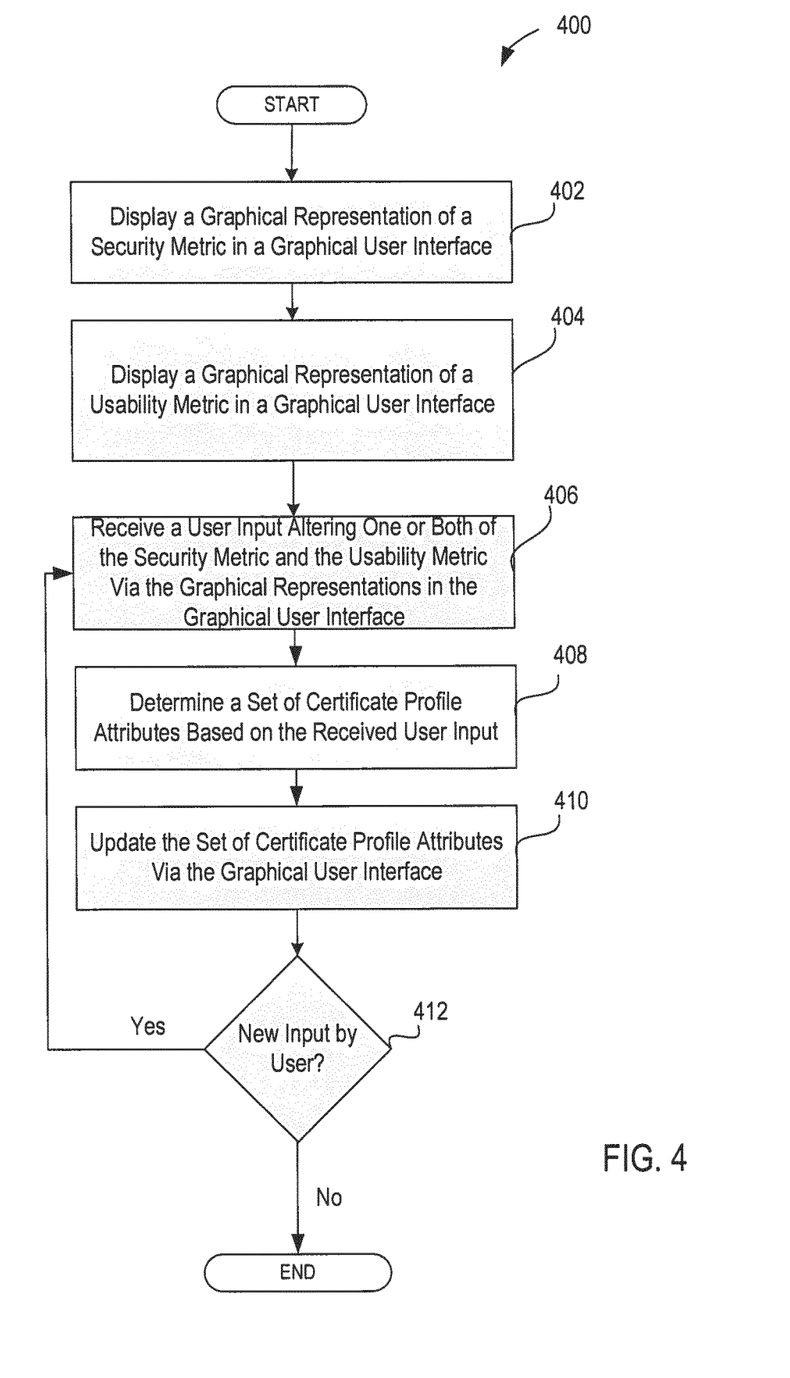
FIG. 4 is a is a flow diagram of another embodiment of a method for certificate profile configuration.

Processing begins at block 402 with the display of the security graphic in the console interface as described above. At block 404, the usability graphic is also displayed in the console interface, as described above. In one embodiment, the interface allows the user to manipulate the security and usability graphics. For example, the user can click and drag the sliders of the slider bars shown in FIG. 2 and FIG. 7. Since, in one embodiment, the security graphic and the usablity graphic are graphical represnetations of the security metric the usability metric respectively, such user action results, at block 406, in the observation and receipts of user input that alters either the security metric, the usability metric, or both.

In response to the user manually changing either the security metric, the usability metric, or both metrics, in block 408, a set of certificate profile attributes is determined based on the new security metric and/or usablity metric. In one embodiment, this can be accomplished by a brute force calculation where every (or most) possible set of certificate profile attributes is used to calculate a security and a usablity metric, the set that most closely fits to the user-selected security and usablity metrics is chosen as the determined set of certificate profile attributes. Alternatively, various attribute selections can be eliminated from consideration to speed up the determination of the set of certificate profile attributes that best fits the user-selected security and usability metrics. Various other data fitting techniques can also be applied to further increase the speed at which the set of certificate profile attributes can be determined.

Then, at block 410, the set of certificate profile attributes determined at block 408 is used to update the certificate profile attributes displayed in the GUI. In this manner, the user can review the changes, if any, in the certificate profile attributes that resulted from the user manually changing the security graphic, the usability graphic, or both. At block 412 a determination is made as to whether new input is provided by the user was made by the user by again interacting with the security graphic, the usablity graphic, or both via the console interface. If new user action is detected, then the processing continues at block 406 with the receipt of the altered security metric, usability metric, or both. In this manner, changes made by the user can result in near-instantaneous updates to the certificate profile attributes based on user interaction with the security graphic and/or the usability graphic.

Figure 5:
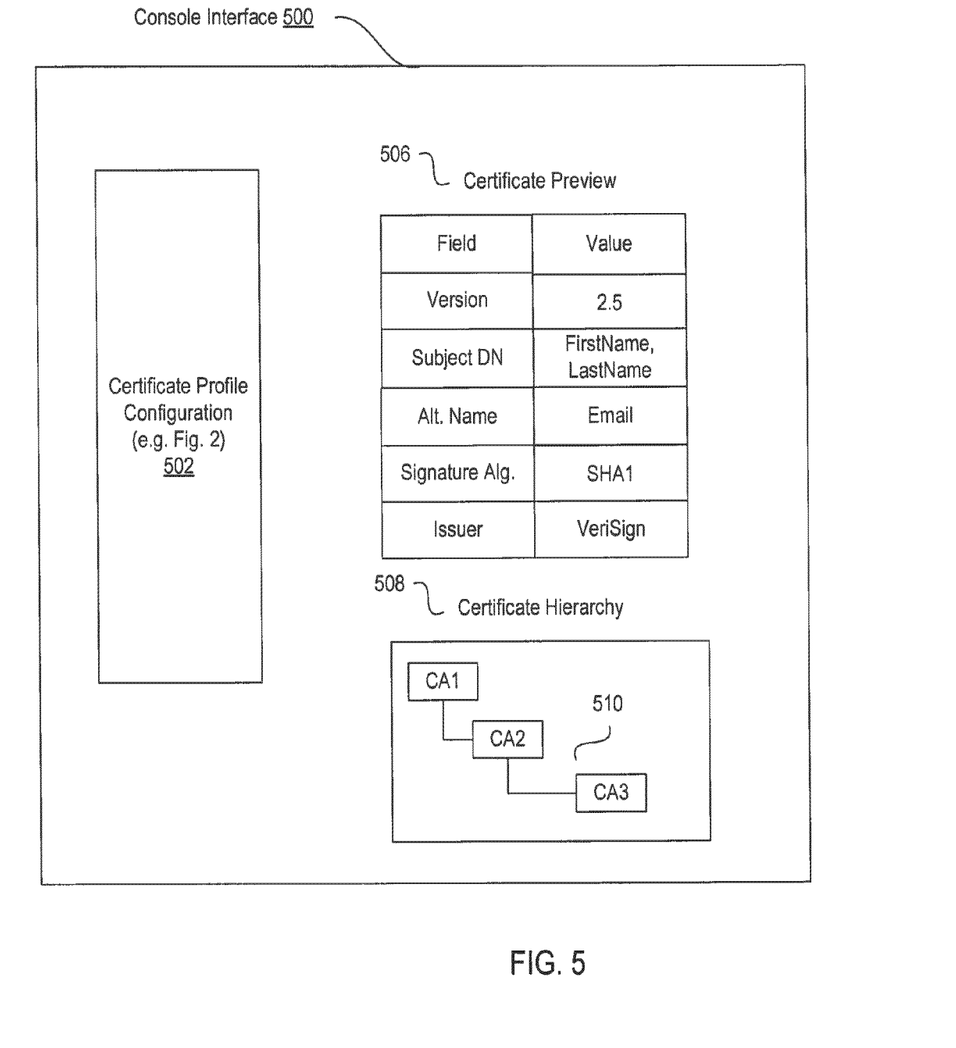
FIG. 5 is a block diagram of another embodiment of the console interface for the PKI manager.

In one embodiment, the certificate profile attributes are also used to generate and display a certificate preview to the user. FIG. 5 illustrates one embodiment of the console interface 500 that includes a certificate preview 506. The GUI interface 500, in one embodiment, includes the certificate profile configuration options 502 shown in and discussed with reference to FIG. 2, in addition to any other possible certificate profile attribute selection tools. The certificate profile attributes selected by the user are then used to generate the certificate preview 506.

In one embodiment, the certificate preview is a graphical representation of the certificate profile or of an example certificate genrated using the certificate profile. In one embodiment, the certificate preview 506 is a table showing the fields of the certificate profile and the corresponding value, or the structures of values. For example, the filed "Version" shows the value "2.5," but the subject distinguished name (DN)—a term from the LDAP protocol—shows the structure of the corresponding value ("FirstName, LastName") and not an actual value.

In one embodiment, the certificate preview is updated in "real time," meaning that changes in the certificate profile attributes are immediately reflected in the certificate preview. In other embodiment, a separate interface element can be provided to update the certificate preview 506. In yet other embodiments, the certificate preview may only appear in the interface when the user takes some action to generate the certificate preview. Another example of the certificate preview 506 in a GUI is provided in FIG. 7.

In one embodiment, the console interface 500 also provides a graphical representation of the certificate chain 508—also referred to as the certificate hierarchy—of the one or more certificate authorities (CA) that are designated in the digital certificate profile as the CAs that will sign the digital certificates generated based the profile. All CAs in a PKI trace their authority back to the root CA, although some PKIs may have multiple root CAs. Thus, for any given CA, there is a chain of authority leading back to the root CA.

In one embodiment, this hierarchical relationship is graphically represented in a tree structure 510 as shown in FIG. 5 and FIG. 7. In the example of FIG. 5, CA3 is selected by the user as the signator CA for the digital certificate profile being edited or created. In this example, CA3 is authenticated by CA2, which in turn is authenticated by CA1, the root certificate. This hierarchical relationship is diplayed in the tree structure 510 certificate chain shown in FIG. 5.

Figure 6:
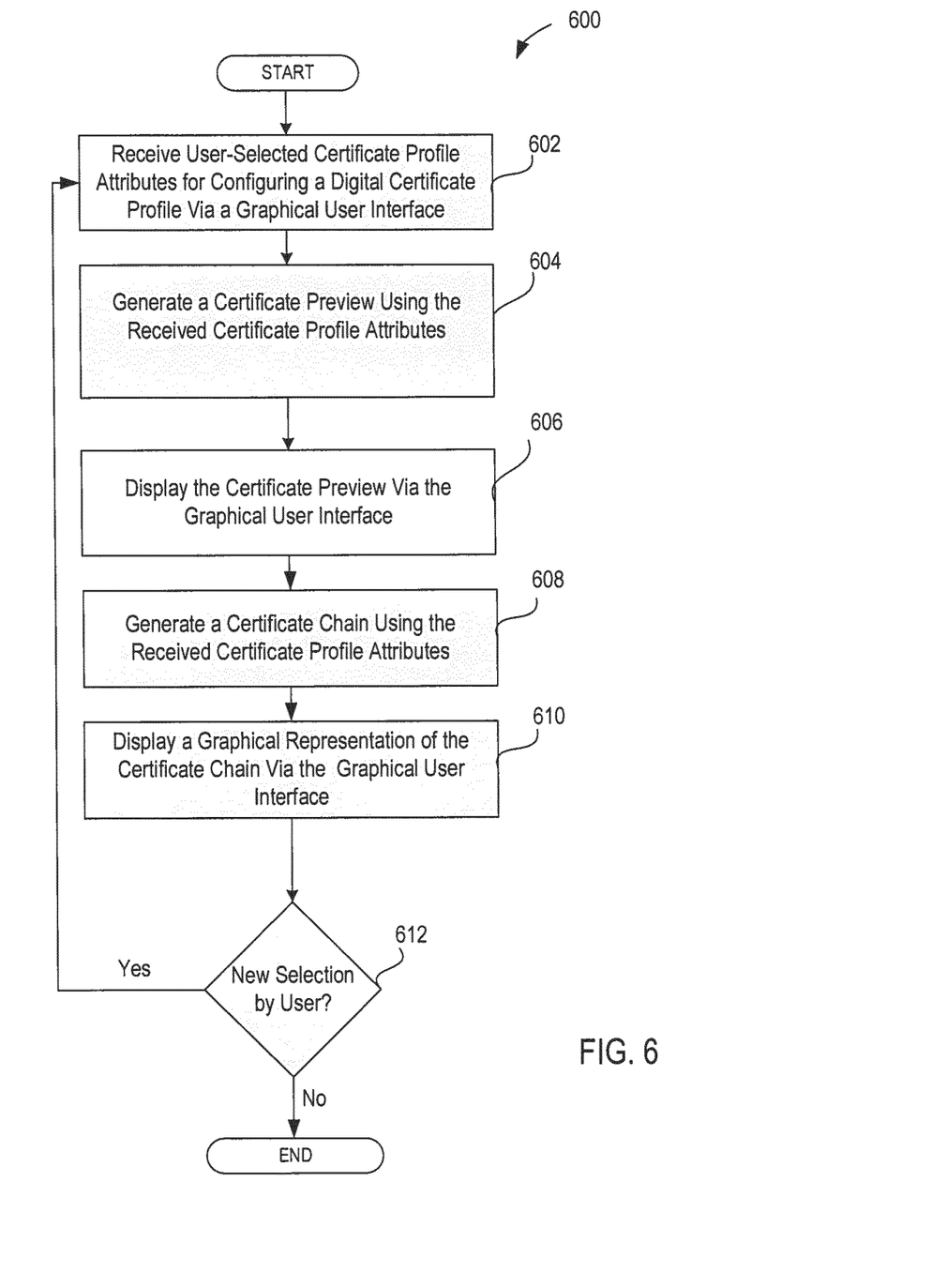
FIG. 6 is a flow diagram of one embodiment of a method for providing a digital certificate preview.

One embodiment of providing a certificate preview and a certificate chain is now described with reference to FIG. 6. The processing can be performed by processing logic that may comprise hardware (circuitry, dedicated logic, etc.), software such as is run on a general purpose computer system or a dedicated machine), or a combination of both. The method shown in FIG. 6 may be performed by the certificate preview module 154 in conjuction with the user interface 144 of FIG. 1, though it may also be performed by other processing logic.

Processing begins at block 602 with receiving with the reception of user-selected certificate profile attributes. The user may be using the console interface to configure a certificate profile, and the current state of the selected certificate profile attributes is sent to the PKI manager as it is entered by a user interacting with the console interface. At block 604, a certificate preview is generated based on the certificate profile attributes configured by the user. In one embodiment, the generation of the certificate preview includes the inclusion of values that are fixed, and indications of the sources of data for fields that are populated only one certificate generation. At block 606, the certificate preview is displayed to the user, as shown for example in FIG. 5 and FIG. 7.

At block 608 a certificate chain is generated based on the identification of a CA identified in the certificate profile attributes. In one embodiment, with reference to FIG. 1, the entire CA hierarchy 166 of the PKI is accessible to the PKI manager 140. Thus, the certificate preview module 154 can access the CA hierarchy 166 to generate the chain of authority between the selected CA (or multiple selected CAs) and the root CA. Then, in block 610, the certificate chain is displayed to the user via the GUI, for example in the form of a tree as shown in FIG. 5 and FIG. 7.

At block 612, a determination is made as to whether a new certificate attribute selection was made by the user via the console interface. If a new certificate attribute selection is detected in the subset of certificate attributes used generate the certificate preview or a new CA selection is detected, then the processing begins anew at block 602 with the receipt of the updated certificate attribute selection or selections. In this manner, changes made by the user can result in near-instantaneous updates to the certificate preview and the certificate chain displays.

FIG. 7 is a screenshot illustrating one embodiment of the console interface 700. The security graphic 705 and the usability graphic 710 are visible. In this embodiment, the certificate preview 715 and the CA chain 720 of the issuing CA is displayed on the right hand side. Numerous attribute setting and selection interfaces discussed above are also shown.

Figure 8:
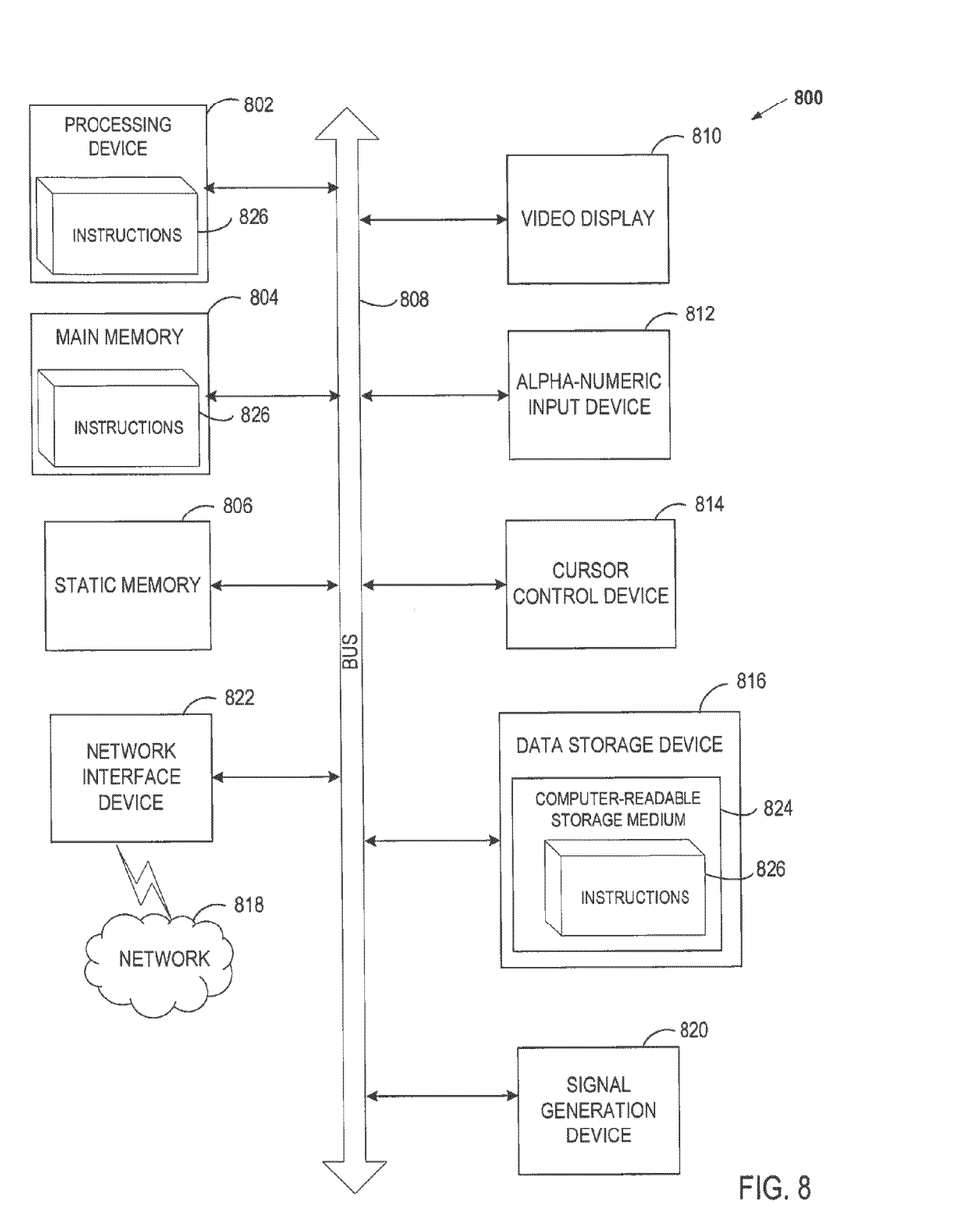
FIG. 8 is a diagram of one embodiment of a computer system for implementing various embodiments of the present invention.

FIG. 8 is a diagram of one embodiment of a computer system that can be used to implement any of the devices described above, such as console 116, directory 124, devices 112, or PKI manager 140. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more specialpurpose processing devices such as an application specific integrated circuit (ASIC), a field programmable gate array (FPGA), a digital signal processor (DSP), network processor, or the like. Processing device 802 is configured to execute the instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 821 (e.g., a speaker).

The secondary memory 816 may include a machine-readable storage medium (or more specifically a computer-readable storage medium) 824 on which is stored one or more sets of instructions 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media. The instructions 826 may further be transmitted or received over a network 818 via the network interface device 822.

The computer-readable storage medium 824 may also be used to store the instructions 826 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to solid-state memories, and optical and magnetic media.

The instructions 826, components and other features described herein (for example in relation to FIG. 1) can be implemented as discrete hardware components or integrated in the functionality of hardware components such as ASICS, FPGAs, DSPs or similar devices. In addition, the instructions 826 can be implemented as firmware or functional circuitry within hardware devices. Further, the instructions 826 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "obtaining," "determining," "generating," "modifying," "decreasing," "increasing," "collecting," "creating," "assigning," "storing," "searching," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and system for opening files subject to application virtualization is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
providing a graphical user interface for creating a digital certificate profile for a digital certificate, the graphical user interface presenting a plurality of certificate profile attributes selectable by a user;

generating, via a processor, a first metric indicating a vulnerability of a digital certificate generated from the digital certificate profile, wherein a value of the first metric is determined based on a selected subset of the certificate profile attributes;

generating a second metric indicating an ease of use of the digital certificate generated from the digital certificate profile, wherein a value of the second metric is determined based on the selected subset of the certificate profile attributes;

generating, via the processor, a certificate profile preview representing an example of the digital certificate to be generated, wherein the certificate profile preview includes a graphical representation of the first and second metrics; and providing a graphical representation of the generated certificate profile preview in the graphical user interface, wherein the graphical representation includes a certificate table having a first column having a list of certificate fields and a second column having a list of values corresponding to the certificate fields, the list of values including structural representations of values to be collected when creating digital certificates using the digital certificate profile.

2. The method of claim 1, wherein the list of values includes values as they will appear on digital certificates created using the digital certificate profile.

3. The method of claim 1, wherein one of the certificate profile attributes in the selected subset comprises an identification of a certificate authority to be used for creating digital certificates using the digital certificate profile.

4. The method of claim 3, wherein generating the certificate profile preview comprises generating a certificate authority hierarchy associated with the identified certificate authority.

5. The method of claim 4, further comprising, providing a graphical tree representation of the generated certificate authority hierarchy associated with the identified certificate authority.

6. The method of claim 1, wherein the certificate profile preview is automatically updated when the user selects a new set of certificate profile attributes in the graphical user interface.

7. A system comprising:
a memory; and
a processing device coupled with the memory to:
provide a graphical user interface for creating a digital certificate profile for a digital certificate, the graphical user interface presenting a plurality of certificate profile attributes selectable by a user, generate a first metric indicating a vulnerability of a digital certificate generated from the digital certificate profile, wherein a value of the first metric is determined based on a selected subset of the certificate profile attributes, generate a second metric indicating an ease of use of the digital certificate generated from the digital certificate profile, wherein a value of the second metric is determined based on the selected subset of the certificate profile attributes, generate a certificate profile preview representing an example of the digital certificate to be generated, wherein the certificate profile preview includes a graphical representation of the first and second metrics, and provide a graphical representation of the generated certificate profile preview in the graphical user interface, wherein the graphical representation includes a certificate table having a first column having a list of certificate fields and a second column having a list of values corresponding to the certificate fields, the list of values including structural representations of values to be collected when creating digital certificates using the digital certificate profile.

8. The system of claim 7, wherein the list of values includes values as they will appear on digital certificates created using the digital certificate profile.

9. The system of claim 7, wherein one of the certificate profile attributes in the selected subset comprises an identification of a certificate authority to be used for creating digital certificates using the digital certificate profile, and wherein the processor generates the certificate profile preview by generating a certificate authority hierarchy associated with the identified certificate authority.

10. The system of claim 9, wherein the processor further generates the certificate profile preview by providing a graphical tree representation of the generated certificate authority hierarchy associated with the identified certificate authority.

11. The system of claim 7, wherein the processor automatically updates the certificate profile preview when the user selects a new set of certificate profile attributes in the graphical user interface.

12. A non-transitory computer readable storage medium including instructions that, when executed by a processor, cause the processor to perform a method comprising:
providing a graphical user interface for creating a digital certificate profile for a digital certificate, the graphical user interface presenting a plurality of certificate profile attributes selectable by a user;

generating a first metric indicating a vulnerability of a digital certificate generated from the digital certificate profile, wherein a value of the first metric is determined based on a selected subset of the certificate profile attributes;

generating a second metric indicating an ease of use of the digital certificate generated from the digital certificate profile, wherein a value of the second metric is determined based on the selected subset of the certificate profile attributes;

generating a certificate profile preview representing an example of the digital certificate to be generated, wherein the certificate profile preview includes a graphical representation of the first and second metrics; and providing a graphical representation of the generated certificate profile preview in the graphical user interface, wherein the graphical representation includes a certificate table having a first column having a list of certificate fields and a second column having a list of values corresponding to the certificate fields, the list of values including structural representations of values to be collected when creating digital certificates using the digital certificate profile.

13. The non-transitory computer readable storage medium of claim 12, wherein the instructions further cause the processor to update the certificate profile preview in response to the user selecting a new set of certificate profile attributes in the graphical user interface.

14. The non-transitory computer readable storage medium of claim 12, wherein one of the certificate profile attributes in the selected subset comprises an identification of a certificate authority to be used for creating digital certificates using the digital certificate profile, and wherein generating the certificate profile preview comprises generating a certificate authority hierarchy associated with the identified certificate authority.

15. The non-transitory computer readable storage medium of claim 14, wherein the instructions further cause the processor to provide a graphical tree representation of the generated certificate authority hierarchy associated with the identified certificate authority.

* * * * *